Oct. 4, 1966          A. TRASK          3,276,677
LUBRICATION SYSTEM FOR COMPRESSOR SHAFT JOURNALS
Filed April 7, 1964                     3 Sheets-Sheet 1

INVENTOR.
ALLEN TRASK
BY M.R. Marsh
ATTORNEY

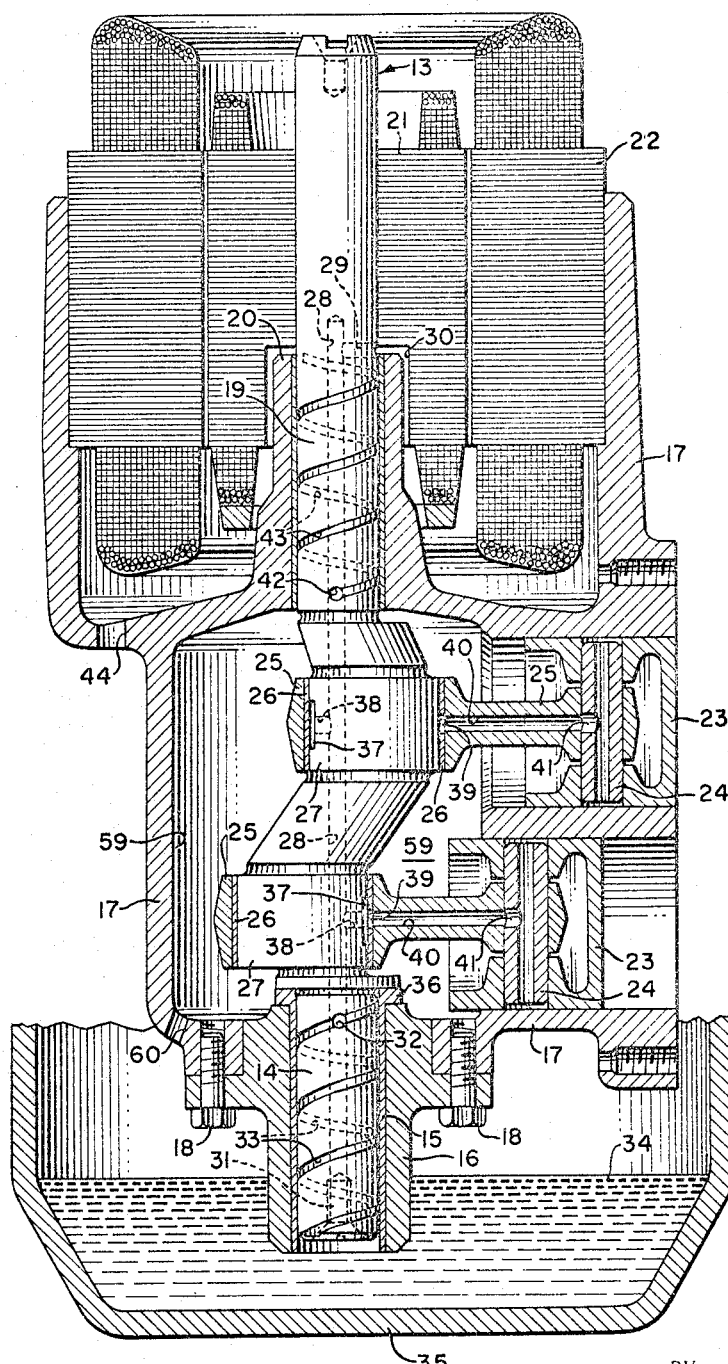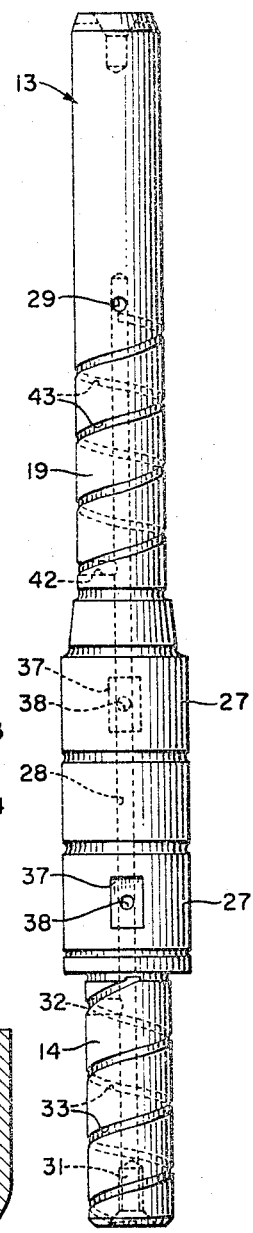

Oct. 4, 1966 A. TRASK 3,276,677
LUBRICATION SYSTEM FOR COMPRESSOR SHAFT JOURNALS
Filed April 7, 1964 3 Sheets-Sheet 3

INVENTOR.
ALLEN TRASK
BY M. R. Marsh
ATTORNEY

United States Patent Office 3,276,677
Patented Oct. 4, 1966

3,276,677
LUBRICATION SYSTEM FOR COMPRESSOR SHAFT JOURNALS
Allen Trask, 1 Noyes St., Utica, N.Y.
Filed Apr. 7, 1964, Ser. No. 358,025
5 Claims. (Cl. 230—206)

This invention relates to the lubrication of bearings for rotating shaft journals having spiral oil grooves therein, and particularly to lubrication systems for refrigeration compressors wherein a lubricating oil is used in conjunction with a refrigerant freely miscible with the oil in substantial proportions.

Many types of machines employing rotating shafts use lubrication oil pumps of various types to supply oil under pressure to the shaft bearings and to force oil into and through distribution oil grooves in the shaft journals or bearings. In many machines it would be possible to eliminate the lubricating oil pump if a spiral oil groove in one of the journals is constructed in accordance with the prevent invention to act as an oil pump capable of drawing oil into itself and generating therein the pressure and flow volume of lubricant required for distribution to other bearings and moving parts such as pistons.

In refrigeration compressors there is a special lubrication problem when the refrigerant used is freely miscible in the lubricant used in substantial proportions. In compressors of this type where internal drilled lubricant conduits in the crankshaft are used for lubricant distribution to the shaft journals, cranks, and pistons, the heat generated by the rotation of the crankshaft journals in their bearings will heat the crankshaft and the lubricant within its internal conduits causing distillation of refrigerant vapor from the mixture of lubricant and liquid refrigerant within the internal conduits and the distribution oil grooves which may be in either the crankshaft journals or bearings. Under normal operating conditions such a lubrication system in a refrigeration compressor may be seriously vapor locked by the pressure and greatly expanded volume of distilled refrigerant vapor forcing lubricant out of the lubricating system and result in inadequate lubrication of moving parts.

In a refrigeration compressor using a volatile refrigerant freely miscible in the lubricating oil it is important to provide within the lubrication system a positive means for distilling and separating excess volatile refrigerant from the lubricant before it is delivered to the desired points such as the crankshaft bearings, connecting rod bearings, wrist pins, and pistons.

It is desirable in a lubrication system using spiral oil grooves to have them of the pressure generating type of this invention, and with a pressure generating potential substantially greater than the minimum lubricant pressure required for distributing lubricant under normal operating conditions. This excess pressure enables foreign matter which might be accidentally entrained in the lubricant to be removed from the spiral grooves which would otherwise stop the lubricant flow in the grooves.

It is also desirable to have spiral oil grooves in a lubrication system of a self priming type constructed to provide the maximum flow of lubricant when the lubricant level of a supply reservoir is accidentally lowered to the level of the entrance to the pumping oil groove so that this spiral groove receives lubricant intermittently.

It is important in a machine lubricating system using spiral oil grooves to have them constructed to minimize the possibility of foreign matter, entrained in the lubricant, entering the clearance space between a journal and its bearing.

In view of the above it is a principal object of this invention to provide a lubricating system wherein a spiral oil groove structure for a shaft journal has the potential of generating lubricant pressure and flow volume in excess of that required for the lubrication system of a complete machine.

Another object of the present invention is to provide a lubricating system having a spiral oil groove structure for crankshaft journals in a refrigeration compressor which has the potential of generating and maintaining a flow volume and pressure of a mixture of lubricating oil and liquid refrigerant flowing therethrough when a supply of lubricant including liquid refrigerant dissolved therein is maintained at the entrance to the spiral groove while the crankshaft is rotating, and when journal and bearing heat is causing distillation of refrigerant within internal crankshaft conduits and within the spiral grooves to cause the flow therein to consist of intermittent and/or commingled units of lubricant and refrigerant vapor.

A further object of the invention is to provide means within a refrigeration compressor crankshaft for thermal and centrifugal separation of refrigerant vapor from a mixture of lubricating oil and liquid refrigerant within conduits therein, and means for releasing vapor from the separation means through a crankshaft exit opening separate from oil grooves in its journals and/or bearings, whereby the lubricant fed to the bearings, journals, and other moving parts will have a minimum of refrigerant liquid therein subject to distillation.

Still another object of the invention is to provide a spiral oil groove for journals having a pressure generating potential substantially in excess of that required for maintaining a flow of lubricant adequate for lubrication of a journal and its bearing under normal operating conditions, for the purpose of pressure ejection of foreign matter from the spiral oil groove which might be accidentally entrained in the lubricant and which might otherwise prevent adequate lubrication of the journal and its bearing.

Another object of the invention is to provide a spiral oil groove that is self priming to provide lubrication intermittently when the lubricant supply level is intermittently lowered below the entrance opening of the spiral groove.

And still another object of the invention is to provide a spiral oil groove structure for shaft journals having a minimum tendency to permit solid foreign matter particles entrained in the lubricant to be drawn into the clearance space between a journal and its bearing to cause scoring of the journal and/or its bearing.

The above and other objects of my invention will be more apparent from the following detailed description of the preferred embodiment thereof wherein reference is made to the accompanying drawings forming a part hereof in the latter of which:

FIG. 2 is a vertical sectional view of a part of a refrigeration compressor embodying crankshaft journals having the type of spiral oil grooves shown in FIG. 1 for delivering lubricant to its journals and other moving parts, and embodying means for separating refrigerant vapor from a mixture of its lubricant with liquid refrigerant;

FIG. 3 is a right hand side view of the crankshaft shown in FIG. 2:

Figure 1:
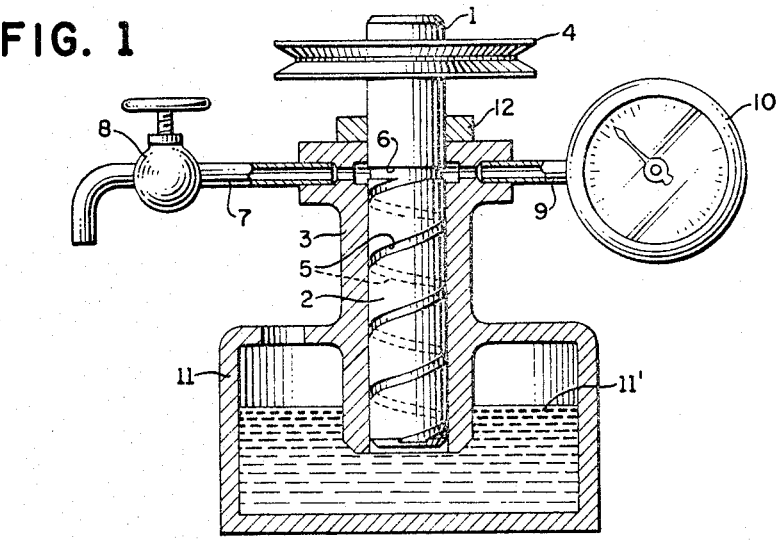
FIG. 1 is a vertical sectional view of a test assembly for measuring the lubricant pressure and flow volume generated by a spiral oil groove for a shaft journal constructed to embody the present invention.
Figure 6:
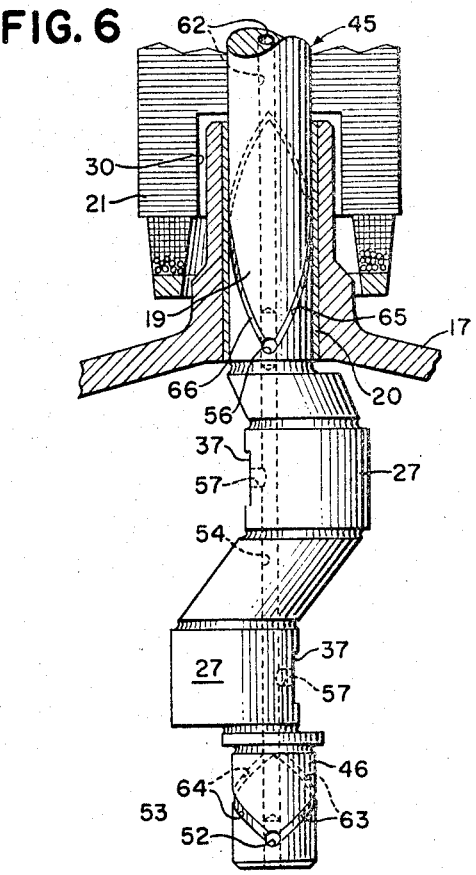
Figure 7:
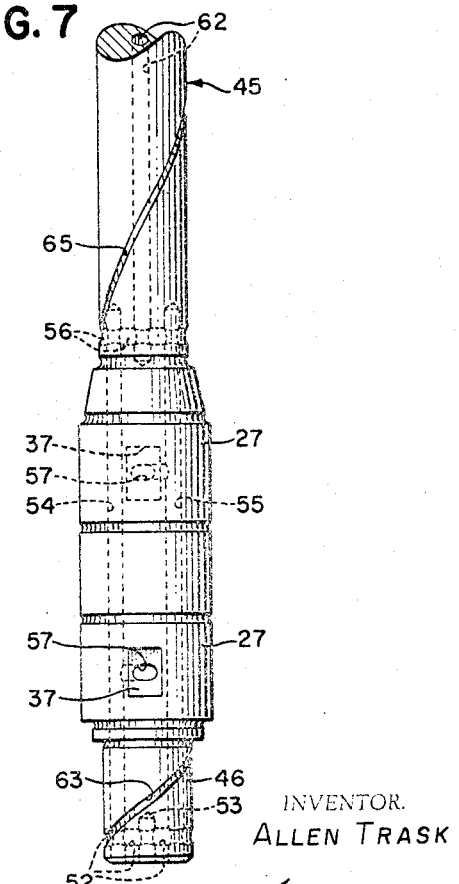
Figure 4:
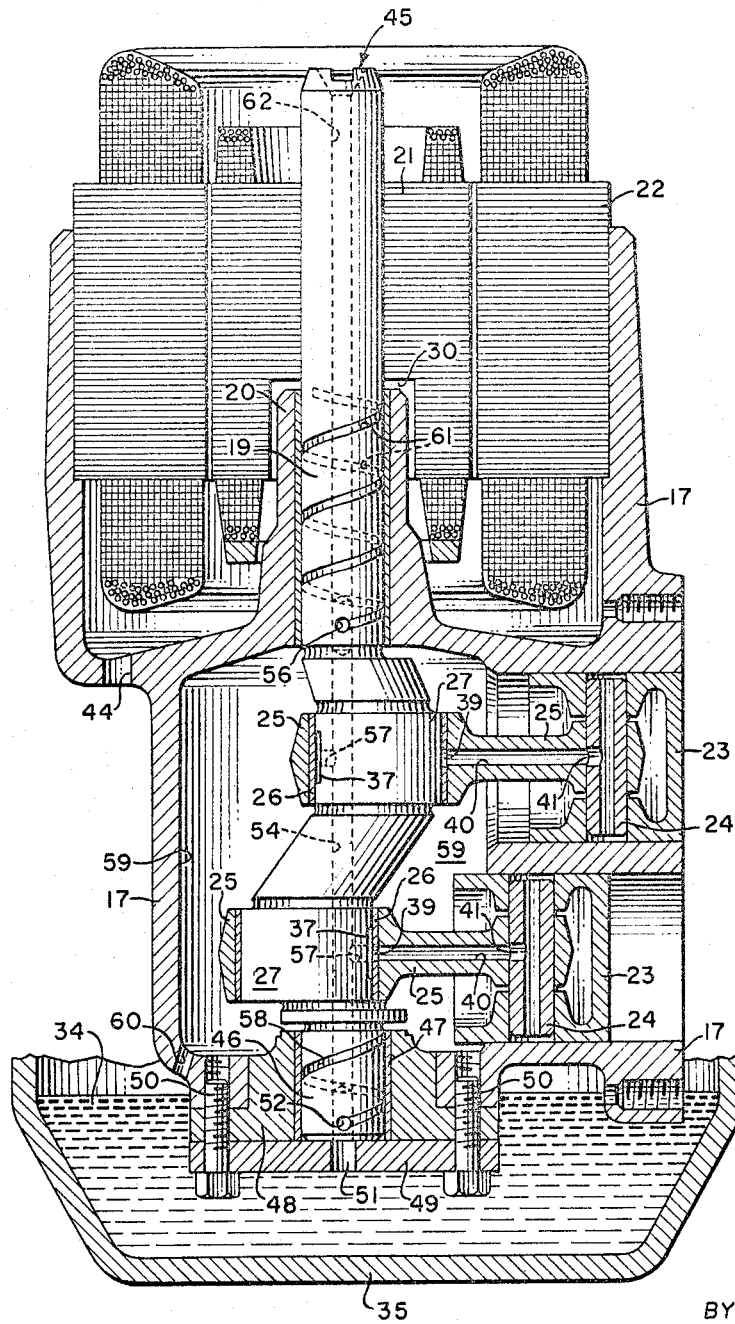
Figure 5:
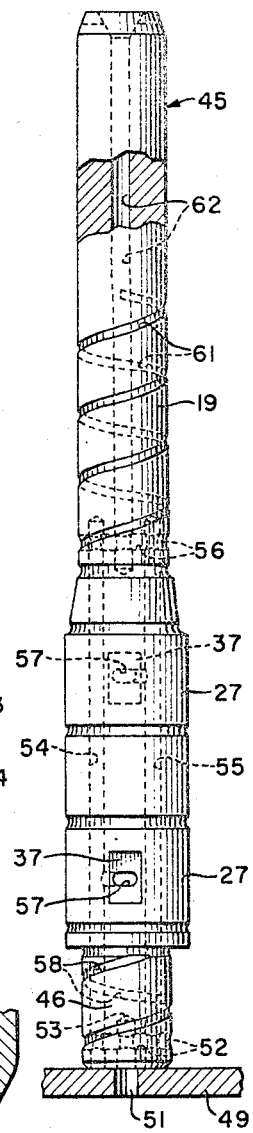

FIG. 4 is a vertical sectional view of a part of a refrigeration compressor including centrifugal means for delivering lubricant to the crankshaft journals and bearings, spiral oil grooves of the type shown in FIG. 1, FIG. 2, and FIG. 3 in the crankshaft journals, means for separating distilled refrigerant vapor from a mixture of lubricant and liquid refrigerant within internal crankshaft conduits, and exit means for releasing refrigerant vapor from the internal crankshaft conduits separate from its journals;

FIG. 5 is a right hand side view of the crankshaft shown in FIG. 4;

FIG. 6 is a view of an alternate crankshaft for the refrigeration compressor shown in FIG. 4, and FIG. 5 wherein dual spiral oil grooves in each journal, one for clockwise and one for counterclockwise crankshaft rotation, are provided for use with 3-phase motors in compressors so constructed that their direction of rotation can not be determined; and FIG. 7 is a right hand side view of the crankshaft shown in FIG. 6.

In FIG. 1, a shaft 1 with journal 2 is arranged to rotate clockwise in bearing 3, by means of pulley 4. Thrust collar 12, secured to shaft 1, supports it on bearing 3. A spiral oil groove 5, cut into the journal 2, extends from the bottom of shaft 1, to annular groove 6, around the shaft near the top of bearing 3. Spiral groove 5, may be cut into the journal 2, by the use of a thread grinding machine capable of maintaining close tolerances on the depth of the groove and its cross sectional contour. The sides of the groove are substantially parallel to radii of shaft 1, and have sharp corners at the surface of the journal 2, to discourage the entrance of particles of foreign matter which may be entrained in lubricating oil into the clearance space between journal 2, and bearing 3. In an alternate configuration the sides of groove 5 may be curved upward from its bottom to sharp corners at the surface of journal 2. The bottom of spiral groove 5, is substantially flat and at right angles to radii of shaft 1.

Conduit 7, in communication with annular groove 6, is connected to shut-off valve 8. Conduit 9, in communication with annular groove 6, is connected to pressure gage 10. A lubricant reservoir 11, is arranged around the lower end of shaft journal 2, and includes a supply of lubricating oil 11'.

When the test assembly of FIG. 1 is provided with a shaft journal 2, one inch in diameter; a spiral groove 5, extending upward for 3" from the bottom of journal 2, to annular groove 6, with a pitch of ¾"; the spiral groove 5, being approximately .009" deep and .093" wide: with lubricating oil 11 of S.A.E.-30 viscosity in lubricant reservoir 11, and the shaft 1 is rotated clockwise at approximately 1750 r.p.m., the maximum oil pressure developed when shut-off valve 8, is closed will be approximately 60-lbs. per square inch. The developed length of the spiral groove 5, will be approximately 15 inches indicating the potential of progressively generating and accumulating pressure in the lubricating oil at the rate of approximately 4 pounds per lineal inch of the spiral groove.

When shut-off valve 8, is fully opened and the maximum oil flow is measured at the outlet of valve 8, the oil volume will be found to be approximately one half of the theoretical displacement of the oil groove 5. When valve 8, is partially closed to cause an indication of pressure on pressure gage 10, the flow rate of oil from shut-off valve 8, will be proportionately reduced. Tests have indicated the oil flow rate to be inversely proportional to the pressure generated and in direct proportion to the cross section area of the spiral groove 5. Thus the spiral oil grooves of this invention may be constructed to provide the lubricant flow volume and pressure required to generously meet the lubrication requirements of a wide variety of machines.

The high rate of pressure generation in oil groove 5, seems to conform to the theory that the combination of oil adhesion and viscosity will progressively generate and accumulate pressure in the oil flow through a spiral oil groove when the groove is shallow enough to cause the oil viscosity to offer substantial resistance between its adhesion to the stationary bearing and its adhesion to the bottom of the rotating spiral groove. Oil adhesion to the stationary bearing surface progressively builds up pressure in the oil against the rotation of the spiral groove. Adhesion to the bottom of the spiral groove supported by the viscosity of the thin ribbon of oil in the groove maintains a flow and pressure in the oil in the direction of the shaft rotation and will not permit a pressure release against the shaft rotation.

The oil pressure potential is found to be inversely proportional to the depth of the oil groove for shallow grooves. In machines having high rotating speeds using relatively low viscosity oil a spiral oil groove depth of .020" or less will be found desirable. In refrigeration compressors operating in the range of conventional motor speeds of 1725 r.p.m. or 3450 r.p.m. a shallow spiral oil groove of .020" or less is desirable depending on the crankcase and bearing temperatures which reduce the viscosity of the lubricating oil with increased temperature.

In refrigeration compressors using a refrigerant exposed to the lubricating oil and miscible therein in substantial proportions the viscosity of the oil and refrigerant mixture is reduced by the presence of the liquid refrigerant in the oil. It may be found desirable in compressors of this type to use spiral oil grooves having a depth of .010" or less.

Tests indicate the oil flow volume against a given pressure resistance to be proportional to the cross section area of a spiral oil groove having an exceptionally shallow depth. The optimum groove depth is found by this invention to be very much shallower than conventional oil grooves, and is determined by the viscosity of the lubricant used and the pressure generating potential desired. The lubricant volume is determined by this invention after the spiral groove depth has been determined, by making the width in proportion to the lubricant pumping volume desired. The pumping volume will be approximately one-half the theoretical displacement of the spiral groove when pumping against a minimum pressure.

Thus one journal oil groove of this invention may be constructed with lubricant pumping capacity for supplying adequate lubricant to one or more additional journals, or to a complete machine such as a compressor. Thus spiral oil grooves of this invention have a substantially higher ratio of width to depth than conventional oil grooves. Usually this ratio will be in the range of 4 to 1, or a higher ratio.

If the oil groove 5, of FIG. 1 were cut in the bearing 3, instead of the journal 2, and the direction of rotation of shaft 1, reversed, the pressure and flow volume test results would be the same as hereinbefore reported.

An interesting conception of the pressure and flow generating potential of the spiral grooves of this invention may be had by contemplating the pressure required to pump a volume of oil through a groove while it is stationary and acting like a capillary tube. Its resistance as a capillary tube is the converse of its flow volume and pressure generating potential when it is in a journal being rotated within a bearing.

In FIG. 2 a vertical crankshaft 13, has a bottom journal 14, supported by bearing 15, in bearing cage 16, assembled to cylinder block casting 17, by screws 18. Crankshaft 13, has its upper journal 19, supported by bearing 20, in cylinder block casting 17. A motor rotor 21, is secured to the upper end of crankshaft 13, and its stator 22, is secured to cylinder block casting 17.

Two pistons 23, assembled into cylinder block casting 17, have tubular wrist pins 24, and connecting rods 25. Connecting rod bearings 26, are journaled on crankshaft cranks 27. Cylinder heads, valves, ports, enclosure for the compressor and motor, etc., are not shown since they are of the conventional type.

Crankshaft 13 has an axial oil hole 28 drilled from its bottom end to connect with radial hole 29 which is in alignment with the clearance space between the upper end of bearing 20 and the bottom of the recess 30 in the motor rotor 21. The end of axial oil hole 28 at the bottom of crankshaft 13 is closed with a screw 31. A radial oil hole 32 in the upper part of the lower crankshaft journal 14 is in communication with axial oil hole 28.

A spiral oil groove 33 of the type shown in FIG. 1 is cut into the lower crankshaft journal 14 with its lower end in communication with a supply of lubricating oil 34 held in a reservoir, the bottom of which is indicated by reference numeral 35. The upper end of spiral groove 33 is in communication with thrust bearing 36 which supports crankshaft 13 and motor rotor 21. Radial oil hole 32 provides communication between axial oil hole 28 and spiral oil groove 33. Cylinder block casting 17 includes crankcase 59 which has a lubricant drain hole 60 in its lower portion.

Flats or slots 37 are milled in the crankshaft journals 27 at the point closest to the axis of the crankshaft and oil holes 38 provide communication between axial hole 28 and slots 37. Oil holes 39 in connecting rod bearings 26 are in communicating alignment with oil holes 40 through the shank of the connecting rods 25. These in turn are in communicating alignment with radial oil holes 41 in the wrist pins 24.

A radial oil hole 42 in the lower portion of upper crankshaft journal 19 is in communication with axial oil hole 28. Spiral oil groove 43 of the type shown in FIG. 1, but narrower in width than oil groove 33 is cut into the upper crankshaft journal 19 with its lower end in communication with radial oil hole 42, and its upper end in communication with the clearance space between the upper end of bearing 20, and the bottom of the recess 30 in the motor rotor 21.

The lubrication system of the refrigeration compressor shown in FIG. 2 functions as follows when the compressor is in operation with shaft 13 rotating clockwise when viewed from the top. When a refrigerant is used which is freely miscible in the lubricating oil a mixture of the two, indicated by 34, will flow into the bottom opening of the spiral groove 33 at the bottom of the crankshaft journal 14. The spiral oil groove 33 is constructed to have a depth, width, and pitch required for generating a pressure and flow volume of lubricant in excess of the amount required for the entire compressor lubrication system.

Lubricant pumped by spiral groove 33 will lubricate sleeve bearing 15 and thrust bearing 36. Lubricant from spiral oil groove 33 will also flow into and through radial hole 32 into axial crankshaft oil hole 28, from which it will enter and flow through crank holes 38, and slots 37, which will spread lubricant over the connecting rod bearings. The required amount of lubricant will flow intermittently in sequence through the opening 39 in the connecting rod bearings 26, through holes 40 in the connecting rod shanks, through holes 41 in the wrist pins 24, and through the hollow wrist pins 24 to the cylinder walls to provide lubrication to the wrist pins 24 and the pistons 23.

Lubricant from crankshaft axial oil hole 28, will flow through radial oil hole 42 to the lower end of spiral oil groove 43 thence upward through groove 43 to lubricate bearing 20. Oil groove 43, is constructed with a depth and width to provide approximately twice the volume of lubricant required by bearing 20. The excess lubricant will flow from the upper end of spiral groove 43 into the clearance space between the upper end of bearing 20 and the bottom of the recess 30 in motor rotor 21 and thence by gravity to and through the hole 44 in cylinder block 17 to the lubricant supply 34.

Lubricant in excess of that required for lubricating the bearings and moving parts described above will flow from the upper end of axial oil hole 28, into and through radial oil hole 29, into the clearance space between the upper end of bearing 20, and the bottom of the recess 30, where it will join the oil discharged from the groove 43 and flow back to the supply 34.

When a volatile refrigerant is dissolved in the lubricant supply 34, a portion of its will be distilled therefrom within the lubricant passages and spiral grooves of the crankshaft 13 by the heat generated at the crankshaft journals, bearings and motor rotor. With the lower crankshaft journal 14, and bearing 15 submerged below the top level of the lubricant supply 34, their temperature rise above the temperature of the lubricant supply 34 will be held to a minimum. This is turn will hold to a minimum the amount of refrigerant vapor distilled from the lubricant within the spiral groove 13, the radial oil hole 32, and the lower portion of axial oil hole 28.

Refrigerant vapor will be distilled from the lubricant and refrigerant mixture within axial hole 28, as it passes therethrough because the lubricant and refrigerant mixture will be heated to temperatures substantially above the average temperature of the lubricant and refrigerant mixture in the supply 34, by the heat generated by rotation of the crankshaft in its bearings, and the heat generated electrically in the motor rotor 21, and transmitted by conduction into the crankshaft and downward therethrough to the circumference of axial oil hole 28.

Centrifugal force acting on the lubricant and refrigerant vapor within axial hole 28, will separate the heavier liquid lubricant from the refrigerant vapor by delivering it to the radial holes 38 in the cranks, and the radial hole 42, in the upper crankshaft journal 19, and this will prevent refrigerant vapor from flowing into radial oil holes 38 and 42. The refrigerant vapor thus separated from the liquid lubricant will tend to flow centrally within the axial hole 28 to its upper end where it will freely escape through radial hole 29 into the clearance space between bearing 20 and the bottom of the motor rotor recess 30.

In the modification of the invention shown in FIGS. 4 and 5, the refrigeration compressor is similar to that of FIG. 2 except for the crankshaft 45 and certain associated elements that will presently be described. The parts similar to those of FIGS. 2 and 3 will be indicated by corresponding reference numerals and the alternate parts will be identified by other reference numerals.

Crankshaft 45, FIGS. 4 and 5, has a journal 46 at its lower end arranged to rotate in bearing 47 held in bearing cage 48. The lower end of crankshaft 45 is supported on thrust bearing plate 49 below bearing cage 48 and screws 50, secure the two to the cylinder block 17. Hole 51, through thrust bearing plate 49, is located under the center of crankshaft 45.

Adjacent the lower end of crankshaft 45, is a transverse oil hole 52. An axial oil hole 53, at the bottom center of the crankshaft is in communication with transverse oil hole 52. Longitudinal eccentric oil holes 54 and 55 are drilled from the bottom of the crankshaft 45, parallel to its axis, and extend upward to intersect a transverse oil hole 56. Diagonal oil holes 57 provide communication between shallow recesses 37 and eccentric crankshaft hole 55.

A spiral oil groove 58, similar to spiral oil groove 5, FIG. 1, in the lower crankshaft journal 46 has its lower end in communication with one end of transverse hole 52 and its upper end in open communication with crankcase 59. A spiral oil groove 61 has its lower end in communication with one end of transverse oil hole 56 and its upper end in communication with the clearance space between the upper end of the upper crankshaft bearing 20, and the bottom of the recess 30. Oil groove 61 is similar to spiral oil groove 43, FIGS. 2 and 3. An axial hole 62, is drilled from the upper end of crankshaft 45 downward to intersect transverse hole 56.

The lubrication system of the refrigeration compressor, shown in FIGS. 4 and 5, functions as follows when the compressor is rotating clockwise as viewed from the top of the crankshaft. When a refrigerant is used which is miscible in the lubricating oil, a mixture of the two as indicated at 34 will flow by gravity through the hole 51 into axial hole 53 at the bottom end of crankshaft 45 and into the lower transverse hole 52 since the top of lubricant supply 34 is above the transverse hole 52. Centrifugal force acting on the lubricant liquid in transverse hole 52 will develop a pressure therein to force it upward through the two longitudinal eccentric holes 54 and 55 to the upper transverse hole 56. Lubricant entering transverse hole 56 and attempting to flow radially inward toward axial hole 62 will meet an opposing centrifugal force equal to that force from which its original pressure was derived. The pressure at the upper ends of the longitudinal eccentric holes will be less than its original pressure, reduced by the amount of pressure required to raise the lubricant from lower transverse hole 52 to upper transverse hole 56. The lubricant will not be forced into axial hole 62, but will fill the longitudinal eccentric holes 54 and 55, while remaining under the pressure of centrifugal force generated in the lubricant within the tranverse hole 52.

Lubricant from longitudinal eccentric hole 55 will pass through diagonal holes 57 in each crank to fill the recesses 37 from which the connecting rod bearings 26, the wrist pins 24 and the pistons 23, will be lubricated. Lubricant from one end of transverse hole 56 will enter the lower end of spiral groove 61, through which it will flow to lubricate upper crankshaft bearing 20, and the surplus lubricant will flow into the clearance space between the upper end of upper crankshaft bearing 20 and the bottom of the recess 30. From this clearance space the surplus lubricant will flow by gravity through drain hole 44, to the lubricant supply 34.

When a volatile refrigerant is dissolved in the lubricant 34 a portion of it will be distilled therefrom within the lubricant passages and spiral grooves in the crankshaft 45 by the heat generated at the crankshaft journals and motor rotor. When the lower crankshaft journal 46, and bearing 47, is submerged below the lubricant level in the crankcase their temperature rise will be held to a minimum by the lubricant 34 to in turn hold to a minimum the amount of refrigerant vapor distilled from the lubricant within the transverse hole 52 and the spiral oil grooves 58. Refrigerant vapor will be distilled from the lubricant as it passes through the longitudinal eccentric holes 54 and 55 in the crankshaft which is heated by the crank journals 27, the upper crankshaft journal 19, and the motor rotor 21. Centrifugal force acting on the lubricant and the refrigerant vapor within the longitudinal eccentric holes 54 and 55 will have a vigorous separating effect causing the liquid lubricant to cling to and flow along the outward surfaces of these holes, while the vapor of much lighter weight will be forced to the inside surfaces of the holes. The refrigerant vapor thus separated will be free to flow upward through the inside portions of the longitudinal eccentric holes 54 and 55 and thence through transverse hole 56 to axial hole 62, through which it will flow freely to escape at the top of crankshaft 45.

FIG. 1 shows the refrigeration compressor crankshaft 45 similar to that of FIGS. 4 and 5 with alternate spiral grooves. The lower journal 46 has a spiral oil groove 63 similar to oil groove 5 of FIG. 1 except it is longer in pitch and shorter in developed length going around approximately one half of journal 46 in the direction for pumping lubricant upward when crankshaft 45 is rotated clockwise as viewed from its top. Spiral groove 63, at its lower end is in communication with one end of transverse oil hole 52, and its upper end extends to the top of journal 46, to permit free discharge of surplus lubricant therefrom. Spiral groove 64, is similar to spiral groove 63, except it extends around approximately one half of journal 46, in the opposite direction for pumping lubricant upward when the crankshaft 45 is rotated counterclockwise. Spiral grooves 63 and 64 at their lower ends are in communication with the end of transverse oil hole 52 and the upper ends extend to the upper end of journal 46 to permit free discharge of surplus lubricant therefrom. The upper ends of spiral grooves 63 and 64 may join each other before they reach the top of journal 46, for the purpose of a minimum pitch angle, or they may be separated at the top of journal 46

The upper journal 19 of crankshaft 45 has a spiral oil groove 65 similar to the oil groove of FIG. 1 except it has a longer pitch and a shorter developed length going around approximately one half of the journal 19 in the direction for pumping lubricant upward when the crankshaft 45 is rotated clockwise as viewed from its top. Spiral oil groove 65, has its lower end in communication with transverse oil hole 56, and its upper end of the upper crankshaft bearing 20, and the bottom of the recess 30, in motor rotor 20. Spiral oil groove 66 is similar to spiral groove 64, except that it extends in the opposite direction for pumping lubricant upward when the crankshaft 45 is rotated counterclockwise. Spiral grooves 65 and 66 at their lower ends are in communication with the end of transverse oil hole 56, and at their upper ends are in open communication with the clearance space between the upper end of the upper crankshaft bearing 20, and the bottom of the recess 30, to permit free discharge of surplus lubricant therefrom. The upper ends of spiral grooves 65 and 66 may join each other before they reach the top of journal 19 for the purpose of a minimum pitch angle, or they may be separated at the top end of journal 19.

Spiral oil grooves such as grooves 64 and 65 having a pitch longer than their journal diameter should be tested for pressure and flow characteristics which may differ from those of the test assembly described under FIG. 1.

The spiral oil grooves 63 and 64, and 65 and 66, are arranged so that lubricant will be pumped upward with crankshaft rotation in either direction. Thus in hermetically sealed or totally enclosed type compressors driven by three-phase motors where the direction of rotation of the motors cannot be predicted or determined by sight, the desired pressures will be developed.

It will be obvious to those skilled in the art that the present invention is not limited to the arrangements shown and described but is susceptible of various changes and modifications without departing from the spirit thereof, and I desire, therefore, that only such limitations shall be placed thereon as are specifically set forth in the appended claims.

What is claimed is:

1. In a machine lubrication system the combination of a shaft, a bearing, a journal on said shaft adapted for rotation within said bearing, a spiral oil groove in the periphery of said journal, a supply of fluid lubricant at one end of said oil groove, said oil groove having a substantially flat bottom surface in a cylindrical plane concentric with said journal .009 inch to .015 inch below the surface of said journal and having a width substantially four times the depth thereof.

2. The combination as set forth in claim 1 and wherein the width of said spiral oil groove is to be determined in direct proportion to the oil flow volume required under a specific pressure.

3. In a refrigeration compressor the combination of a frame, a vertical crankshaft, compressor means operable by said crankshaft, an upper bearing and lower bearing for said crankshaft in said frame, an electric motor stator mounted in said frame, the rotor of said motor being fixed to the upper end of said crankshaft and spaced above said upper crankshaft bearing, means for containing a fluid lubricant with liquid refrigerant mixed therein around at least a portion of said lower bearing, internal passages within said crankshaft providing communication between said lubricant supply means, said bearings and said compressor means, means for pumping lubricant from said supply means to said internal passages within said crankshaft for lubricating said bearings and said compressor means, and an exit passage in said crankshaft connecting said internal passages with the said space between the upper end of said upper bearing and the lower end of said motor rotor through which excess lubricant and refrigerant vapor distilled from lubricant within said internal crankshaft passages will be freely released therefrom.

4. In a refrigeration compressor the combination of a frame, a vertical crankshaft having a central opening in its upper end, compressor means operable by said crankshaft, in upper bearing and a lower bearing for said crankshaft in said frame, a lubricant supply mixed with liquid refrigerant at a level above the lower portion of said lower bearing, internal passages within said crankshaft including at least two longitudinal eccentric passages parallel to the axis thereof providing communication between said bearings and said compressor means, a central opening in the bottom of said crankshaft, centrifugal means for pumping lubricant including radial passages in said crankshaft below the level of the lubricant supply connecting said central crankshaft bottom, opening to said longitudinal eccentric passages whereby centrifugal force acting on lubricant within said radial passages generates pressure and flow in lubricant therein to supply lubricant to said bearings and said compression means, a transverse passage providing communication between the upper portions of said longitudinal eccentric pasages, and an axial vapor exit passage within the upper end of said crankshaft connecting said transverse passage with said central opening in the upper end of said crankshaft through which refrigerant vapor distilled from the lubricant in said internal crankshaft passages will be freely released therefrom.

5. In a refrigeration compressor the combination of a frame, a vertical crankshaft, compressor means operable by said crankshaft, an upper bearing and a lower bearing for said crankshaft in said frame, an electric motor stator mounted in said frame, the rotor of said motor being fixed to the upper end of said crankshaft and spaced above said upper crankshaft bearing, means for containing a fluid lubricant with liquid refrigerant mixed therein around at least a portion of said lower bearing, internal passages within said crankshaft providing communication between said lubricant supply means, said bearings and said compressor means, means for pumping lubricant from said supply means to said internal passages within said crankshaft for lubricating said bearings and said compressor means, and a vent passage in communiction with said internal passages within said crankshaft, said vent passage opening being at a position on said crankshaft above the top of said upper crankshaft bearing.

References Cited by the Examiner

UNITED STATES PATENTS

| | | | |
|---|---|---|---|
| 2,246,868 | 6/1941 | Trask | 230—206 |
| 2,513,912 | 7/1950 | Bousky | 230—206 |
| 2,738,122 | 3/1956 | Gardiner | 230—206 X |
| 2,930,522 | 3/1960 | Reichard | 230—206 |

LAVERNE D. GEIGER, *Primary Examiner.*

H. BELL, *Assistant Examiner.*